United States Patent
Manglani et al.

(10) Patent No.: US 11,665,027 B2
(45) Date of Patent: *May 30, 2023

(54) FAST CONTROL INTERFACE

(71) Applicant: Analog Devices, Inc., Wilmington, MA (US)

(72) Inventors: Manish J. Manglani, Apex, NC (US); Christopher Mayer, Dover, MA (US)

(73) Assignee: Analog Devices, Inc., Wilmington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/375,043

(22) Filed: Jul. 14, 2021

(65) Prior Publication Data
US 2022/0038312 A1 Feb. 3, 2022

Related U.S. Application Data

(63) Continuation of application No. 16/726,579, filed on Dec. 24, 2019, now Pat. No. 11,070,401, which is a continuation of application No. 14/260,875, filed on Apr. 24, 2014, now Pat. No. 10,530,611.

(60) Provisional application No. 61/815,931, filed on Apr. 25, 2013.

(51) Int. Cl.
*H04L 25/02* (2006.01)
*H04B 1/401* (2015.01)

(52) U.S. Cl.
CPC ........ *H04L 25/0264* (2013.01); *H04B 1/401* (2013.01)

(58) Field of Classification Search
CPC ............................. H04L 25/0264; H04B 1/401
See application file for complete search history.

(56) References Cited

U.S. PATENT DOCUMENTS

| | | | |
|---|---|---|---|
| 2008/0146186 A1* | 6/2008 | Rofougaran | H04B 1/3833 455/333 |
| 2009/0104900 A1* | 4/2009 | Lee | H04B 1/0053 455/418 |

OTHER PUBLICATIONS

X. Liu et al., "An Ultra Low Power Baseband Transceiver IC for Wireless Body Area Network in 0.18um CMOS Technology," in IEEE Transactions on Very Large Scale Integration (VLSI) Systems, vol. 19, No. 8, pp. 1418-1428, Aug. 2011, doi: 10.1109/TVLSI.2010.2053393. (Year: 2011).*

* cited by examiner

*Primary Examiner* — Eric T Oberly
(74) *Attorney, Agent, or Firm* — ArentFox Schiff

(57) ABSTRACT

Devices exchange control signals with each other to ensure proper operation of an overall system. For instance, in a communication system, a baseband processor and a transceiver communicate with each other to exchange information for controlling the respective signal processing parts of the baseband processor and the transceiver. While Serial Peripheral Interfaces (SPIs) can be used, SPI can be extremely slow, and does not provide a protocol for allowing a complex set of control signals to be exchanged between the baseband processor and transceiver. The present disclosure describes a fast control interface which can support various modes of operation in allowing two devices to communicate with each other quickly and effectively.

20 Claims, 9 Drawing Sheets

FAST CONTROL INTERFACE

PRIORITY DATA

This application is a continuation application of U.S. Non-Provisional patent application Ser. No. 16/726,579 (filed Dec. 24, 2019, and entitled "FAST CONTROL INTERFACE"), which receives the benefit and claims priority to U.S. Non-Provisional patent application Ser. No. 14/260,875 (filed on Apr. 24, 2014, and entitled "FAST CONTROL INTERFACE"), which receives benefit and claims priority to U.S. Provisional Patent Application Ser. No. 61/815,931 (filed on Apr. 25, 2013, and entitled "FAST CONTROL INTERFACE"). Both the U.S. Non-Provisional Patent Applications and the U.S. Provisional Patent Application are hereby incorporated by reference in their entirety.

TECHNICAL FIELD OF THE DISCLOSURE

The present disclosure relates generally to interfacing electronic devices and, more particularly, to a fast control interface between a baseband processor and a transceiver.

BACKGROUND

Interfaces provide a communication path between two or more devices. For example, in a wireless communication device, an interface is typically provided between a transceiver and baseband processor to support data communication between the two devices such that they can cooperate with each other to provide wireless communications. Serial peripheral interfaces (SPI) are popular; however, SPIs suffer from significant drawbacks due to its serial communication technique, number of data communication lines (1 or 2), and low operation frequency. SPI usage in wireless communication devices can limit functionality and robustness of the wireless communication devices, because a lot of control data is often passed between the baseband processor and the transceiver, and the control data can sometimes be time sensitive. For example, real time control between a baseband processor and a transceiver can be unfeasible due to the slow communication speeds of SPIs.

OVERVIEW

Devices exchange control signals with each other to ensure proper operation of an overall system. For instance, in a communication system, a baseband processor and a transceiver communicate with each other to exchange information for controlling the respective signal processing parts of the baseband processor and the transceiver. While Serial Peripheral Interfaces (SPIs) can be used, SPI can be extremely slow, and does not provide a protocol for allowing a complex set of control signals to be exchanged between the baseband processor and transceiver. The present disclosure describes a fast control interface which can support various modes of operation in allowing two devices to communicate with each other quickly and effectively.

BRIEF DESCRIPTION OF THE DRAWING

To provide a more complete understanding of the present disclosure and features and advantages thereof, reference is made to the following description, taken in conjunction with the accompanying figures, wherein like reference numerals represent like parts, in which.

DESCRIPTION OF EXAMPLE EMBODIMENTS OF THE DISCLOSURE

Understanding Control Interfaces

Figure 1:
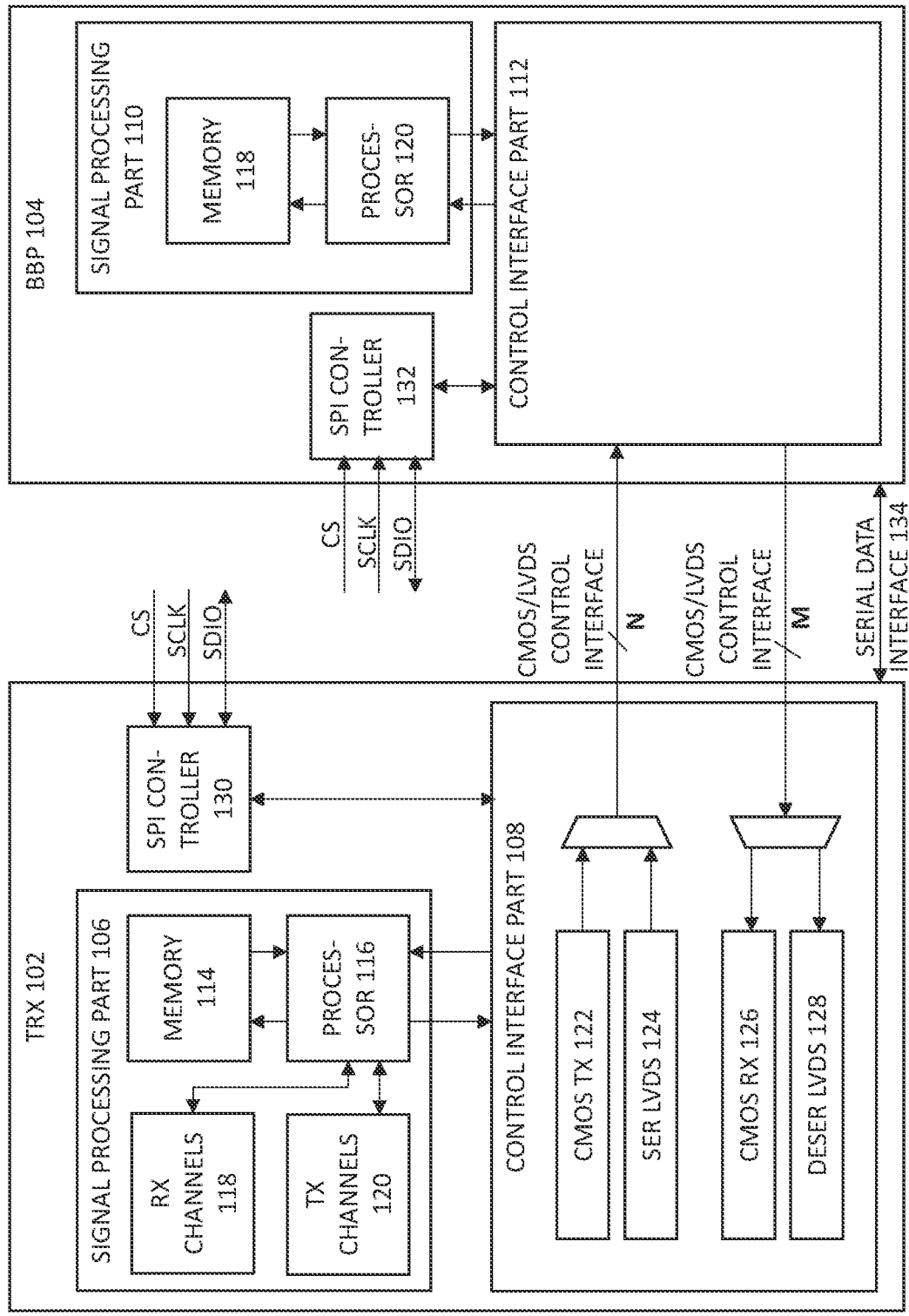
FIG. 1 shows an illustrative system having a transceiver, a baseband processor, and a fast control interface allowing the transceiver and the baseband processor to communicate with each other, according to some embodiments of the disclosure.

Electronic devices often do not work in isolation. Rather, electronic devices cooperate with other electronic devices in electronic systems to accomplish many functions today. For instance, a computer comprises a myriad of electronic devices each with its own set of signal processing functions, e.g., processing data/signals, transmitting and receiving data, rendering data for display, receiving and processing user input, etc. These electronic devices are often cooperating with each other to perform a particular task, and during such cooperation, one electronic device would be required to signal to another electronic device to control the signal processing functions of the other electronic device. For instance, a data receiver may signal to a data processor control information/data with regards to a signal be being received such that the data processor can improve or adjust the signal processing functions for processing the signal in such data processor.

Typically, these electronic devices are coupled together, e.g., on printed circuit boards or some other suitable material to which electronic devices can be mounted, to form an electronic system. Wires interconnecting these electronic devices are provided on these printed circuit boards to allow the devices to signal each other. As the electronics industry push to have smaller and cheaper electronic systems, the space for wires and pins to interconnect these electronic devices becomes more limited since more pins and wires usually require more space and complex printed circuit boards.

At the same time, the speed at which these electronic devices process signals continues to get faster, thus the speed at which these electronic devices need to signal each other also gets faster. The higher the number of pins typically means more data bits can be transmitted in parallel and faster the bits can be transmitted. Many electronics systems designers would default to having a higher pin count to accommodate the fast transfer of control data between the devices. The pressure to reduce pins and to increase the speed of being able to provide control signals can be competing requirements in electronics system design.

These above-mentioned issues are particularly severe in communication systems. Communication protocols and standards continue to drive up bandwidth and speed requirements for these systems, which further drives up the complexity of such communication systems (which could require sophisticated control mechanism between the devices in such communication systems). Generally, these communication systems would include a transceiver (TRX) and a baseband processor (BBP). The TRX can have a signal processing part which includes two receivers (Rx1 and Rx2, Rx being short for receiver), two transmitters (Tx1 and Tx2, Tx being short for Transmitter), one digital pre-distortion (DPD) feedback path and one sniffer (SNF) channel Rx. While not specifically mentioned throughout the document, it is envisioned by the present disclosure that the TRX can have other numbers of receiver(s) and transmitter(s). For instance, the TRX can have $m_r$ receiver(s) and $n_r$ transmitters, where $m_r$ and $n_r$ are positive integers. There is considerable digital content and signal processing, and monitoring and reporting of signal conditions between TRX and BBP are often required for optimal link performance. With such a high volume of information to be exchanged, conventional systems could dedicate, e.g., 20-30 pins, to allow many types of information to be exchanged such that the information can be exchanged quickly enough between TRX and BBP. To complicate matters further, a critical requirement may specify TRX and BBP to use minimal balls/pins for interfacing between the TRX and BBP.

An Improved Fast Control Interface

The present disclosure describes an improved fast control interface which can alleviate some of these issues described above. In an embodiment, the fast control interface may be provided in a wireless device, for example a base station or a mobile unit. The fast control interface may provide fast, reliable communication between a baseband processor (BBP) and a transceiver (TRX).

The system may include a transceiver (TRX) and baseband processor (BBP) communicatively coupled via a control interface. The control interface can support multiple communication modes, such as Complementary metal-oxide-semiconductor (CMOS) mode, Low Voltage Differential Signaling (LVDS) mode, etc. The control interface may provide a first set of lines providing communication from the TRX to BBP and may provide a second set of lines providing communication from the BBP to TRX. The number of lines/pins provided in the control interface may be related to the different communication modes supported. In an embodiment, the different communication modes (e.g., CMOS, LVDS) may use the same lines and/or pins; therefore, the different communication modes may be used alternatively (i.e., one at a time). The control interface provides fast, reliable communication between TRX and BBP to facilitate more dynamic functionality control such as real time gain control by the BBP.

The interface described in herein can effective solve the issue of pin counts while providing a fast interface to alleviate the issue of slow speeds in SPIs. The improved fast control interface requires as little as 3 wires/lines for communication from the TRX to the BBP and another 3 wires for communication from the BBP to the TRX. This control interface, independent of SPI, allows real-time reporting of signal conditions on all receivers and allows the BBP to configure some aspects of the TRX on a real-time basis. Furthermore, another advantageous aspect of this control interface provide closed-loop communication between the two devices which can be tremendously useful for reporting conditions to/from the TRX and BBP for real-time dynamic gain control.

In some cases, the system may also include an SPI controller. For instance, the SPI may be used in conjunction with the control interface for lower level functionality such as initialization processes and communication mode selection (e.g., CMOS versus LVDS) in the control interface.

The control interface may also provide fast signaling protocols and/or priority encoding schemes. In an embodiment, some types of signaling may be prioritized. For example, signaling from the TRX to BBP related to upper/lower peak threshold crossing and overload count exceeding may be prioritized higher than other signaling and communicated to the BBP via the control interface accordingly. Based on these signals, the BBP may control the receiver/transmitter gain and/or attenuation via the control interface in real time. Thus, because of the control interface, BBP may implement real time control over particular functionality in the TRX.

For instance, the control interface may provide dynamic gain control functionality. The receiver may measure power and detect peaks at multiple locations, which may be communicated to the baseband processor via the control interface. In turn, the baseband processor may adjust the gain control block accordingly to provide optimal and fast gain control. This gain control algorithm is merely exemplary and other algorithms may also be implemented.

The control interface may also provide a fast and efficient technique, i.e., a low latency interface, of transferring time critical information such as gain loop control. For example, this type of information may be communicated using a small payload such as a single byte payload. In an embodiment, a low latency application payload may be included in a frame header. Thus, the control interface may provide low latency communication benefits. This mode is particularly useful for transporting time-critical information, which in some cases, is essential for a baseband processor to accomplish its tasks.

Another important feature of this interface is that the BBP can leverage the control interface from BBP to TRX to control external components like power amplifiers, switches, external low noise amplifiers, etc. The presence of 12 GPIO 3p3V pins on the TRX allows the BBP to control external components on the PCB with a low pin count and reduction in wires between the BBP and TRX.

The TRX, in an embodiment, may also include a processor and local memory (e.g., RAM). The processor may execute instructions stored in the local memory to perform various operations. In an embodiment, the BBP may store program instructions in the local memory of the TRX. The BBP may then transmit a control signal via the control interface to execute a specified program instruction in the TRX processor. The BBP control signal may correspond to a location of the specified program instruction in the TRX memory. The TRX processor in turn may execute that specified program instruction to perform the corresponding operation. Therefore, the use of the fast communication technique provided by the control interface in addition to the controlled use of TRX processor and local memory may increase the speed and accuracy of TRX operations.

The resulting fast control interface provides ease of implementation of the interface on the BBP and flexibility in selection of monitored and reported data. Another important feature of this fast control interface is that the BBP can leverage the control interface from BBP to TRX to control external components like power amplifiers, switches, external low noise amplifiers, etc. The presence of 12 GPIO 3p3V pins on the TRX allows the BBP to control external components on the printed circuit board with a low pin count and reduction in wires between the BBP and TRX.

While the disclosure describes an implementation specific to interfacing between a transceiver and a baseband processor, it is envisioned that the fast control interface can be used where the above-mentioned issues are present. For instance, the improved fast control interface can be provided to allow electronic devices to transmit and/or receive control data in other high speed applications where a high volume of control data is exchanged, and some of the control data is time sensitive. It is important to note that the control interface which allows control data to be exchanged between electronic devices are distinguished from (and not to be confused with) data transfer interfaces. Data transfer interfaces are tailored for transmitting streams of content data rather than control data, where the content data is generally not used for controlling the signal processing within these devices. Furthermore, data transfer interfaces are typically designed to transmit a single kind of content data, e.g., content from data converter outputs and inputs. In contrast, control data can often be short bursts of control information (on the order of a few bytes), and can include many types of control information.

Overview of the System: Baseband Processor (BBP) and Transceiver (TRX)

FIG. 1 shows an illustrative system having a transceiver, a baseband processor, and a fast control interface allowing the transceiver and the baseband processor to communicate with each other, according to some embodiments of the disclosure. In this example, the system includes transceiver (TRX) 102 and baseband processor (BBP) 104. Broadly speaking, the system includes a first device (e.g., TRX 102) and a second device (e.g., BBP 104) connected together to allow control data to be exchanged between them, and each of them includes a signal processing part and a control interface part. As seen in the figure TRX 102 has a signal processing part 106 and a control interface part 108, and BBP 104 has a signal processing part 110 and control interface part 112.

The signal processing parts 106 and 110 refer to components (e.g., circuits) in an electronic device which perform operations and/or analysis of signals to transform input signals to generate output signals to accomplish one or more functions or tasks. The signals can be analog signals, digital signals, or a mix of both types. In TRX 102, the signal processing part 106 can include memory element(s) 114 for storing data and/or instructions (any type of memory element for storing data and/or instructions is envisioned), processor(s) 116 for executing the instructions, receive (RX) channels 118, and transmit (TX) channels 120. These components provide circuitry for receiving, transmitting, and processing signals. These components can include antennas, modulators, filters, mixers, splitters, buffers, predistortion filters/algorithms, power amplifiers, analog-to-digital converters (ADCs), digital-to-analog converters, and so on. In BBP 104, the signal processing part 110 can include memory element(s) 118 for storing data and/or instructions, and processor(s) 120 for executing the instructions. These components provide circuitry for processing signals received and signals to be transmitted, typically in the digital domain. The components may include signal processing modules, signal generators, modulators, radio control modules, encoders, decoders, filters, (digital) predistortion module, and so forth. The baseband processor may store signals, process the signals to prepare the signals for radio transmission, improve radio performance through signal modulation, encoding, frequency shifting, (digital) predistortion, parameter selection, etc. In some embodiments, the functions in the TRX and BBP depend on each other and the TRX and BBP often work in tandem.

The control interface parts 108 and 112 (separate and distinguished from the signal processing parts 106 and 110) refers to components (e.g., circuits) in an electronic device which processes incoming control data and relays the information in the control data to the signal processing part (or a suitable component in the signal processing part). The control interface part can in some cases include the pins for interconnecting TRX 102 and BBP 104.

Control interface part 108 is provided with either or both transmitting and receiving circuitry for transmitting and receiving control data respectively. Control interface part 108 are provided with circuitry to support one or more of the following modes: Complementary metal-oxide-semiconductor (CMOS) mode, Low Voltage Differential Signaling (LVDS) modes. These modes are described in further detail herein. If both modes are supported, the modes may use the same lines and/or pins (by means of the multiplexers); therefore, the different communication modes may be used alternatively (i.e., one at a time).

To transmit control data, control interface part 108 is configured with N pins/lines, and can include one or more of the following: a CMOS transmit module 122, and an LVDS serializer module 124. The CMOS transmit module 122 supports generating the control signals for the CMOS mode, and the LVDS serializer module 124 supports generating/serializing the control signals for the LVDS mode. To receive control data, control interface part 108 is configured with M pins/lines, and can include one or more of the following: a CMOS receive module 126, and an LVDS deserializer module 128. The CMOS receive module 126 supports processing the received control signals for the CMOS mode, and the LVDS deserializer module 128 supports deserializing and processing the received control signals for the LVDS mode. N and M are preferably kept at a minimum. Embodiments may specify N and/or M to be 3, 4, and 6.

Although not shown in the diagram, control interface part 112 can also be configured to support one or more of the following modes: CMOS mode and LVDS mode. It can also be configured to either or both transmit or receive control data. Same or similar modules in the control interface part 108 can be implemented in control interface part 112.

In the embodiment shown, TRX 102 can optionally include a Serial Peripheral Interface (SPI) controller 130 for transmitting and receiving control data alongside with control interface part 108. BBP 104 may also include a SPI controller 132 for transmitting and receiving control data alongside with control interface part 112. In some cases, the SPI controller 130 can be used to program the functionality of control interface part 108. Similarly, the SPI controller 132 can be used to program the functionality of control interface part 112.

In the embodiment shown, TRX 102 and BBP 104 has a serial data interface 134 for transporting streams of content data between TRX 102 and BBP 104. For instance, a serial data interface supporting the Joint Electron Devices Engineering Council (JEDEC) JESD204x standards can be provided. The serial data interface 134 is distinguished from the control interface between TRX 102 and BBP 104. The serial data interface is used for transmitting streams of content data; the control interface is used for transmitting control data.

Types of Control Data

The fast control interface is superior over the SPI interface because of the ability of the fast control interface to accommodate exchange of a high volume of control data and to exchange some control data quickly enough to support real-time control. A large number of types of data can be exchanged through the fast control interface disclosed herein.

For TRX to BBP signaling, the possible functions in the signal processing part that monitor received signal parameters include, but are not limited to:

Received Signal Strength Indicator (RSSI)
Power of signal with respect to Analog-to-digital converter (ADC) FS (Full Scale)
Upper/Lower peak threshold exceeded at ADC output;
Upper/Lower peak threshold exceeded in analog peak detector
Overload count exceeded for peak detector at ADC output;
Overload count exceeded at analog peak detector;
Gain increased or decreased;
Current gain index after gain change;
Upper/Lower power threshold exceeded;
Indicator showing serial data interface (e.g., JESD) framer input data has switched from sniffer path to digital predistortion (DPD) observation path (and vice versa);
Indicator for start of all real-time tracking algorithms; and
Indicator for completion of all real-time tracking algorithms.

All these signal monitoring or "indicator" signals are can be made available via read back from the SPI port, though some of these signals when not read back in real time would be invalid.

Communication from the BBP to the TRX is expected to be sparser than from TRX to BBP. For BBP to TRX signaling, the possible functions in the signal processing part that would be transmitted on the interface include, but are not limited to:

Switch between multiple Low Noise Amplifiers (LNAs) at the input to the sniffer path;
Enable/disable DPD mode captures (and route DPD data to BBP);
Switch MUX between PA1 (power amplifier 1) and PA2 (power amplifier 2);
outputs for DPD path;
Enable/disable sniffer path captures (and route received data to BBP);
Switch Local Oscillator (LO) frequency of sniffer path;
Enable/disable continuous power/RSSI measurements on sniffer path;
Enable a synchronous power measurement on Rx (useful for Time Division Synchronous Code Division Multiple Access (TD-SCDMA), Time-Division Long-Term Evolution (TD-LTE) and other Time-Division Duplex (TDD) systems);
Enable/disable Receiver (Rx)/Transmitter (Tx) in real-time (TDD systems);
Change gain of Rx1 (receive path 1) and/or Rx2 (receive path 2); (this is often time sensitive/critical information which is to be exchanged between the TRX and BBP very quickly);
Change gain of sniffer path; (this is often time sensitive/critical information which is to be exchanged between the TRX and BBP very quickly);
Enable gain change in the hybrid mode of the Automatic Gain Control (AGC) on Rx1 and/or Rx2 (this is often time sensitive/critical information which is to be exchanged between the TRX and BBP very quickly);
Change General-purpose input/output (GPIO) 3p3V pin outputs from HIGH to LOW or LOW to HIGH (to control external amplifiers and other components);
Start/stop initialization and tracking algorithms for quadrature error correction, LO leakage, and DC offset correction with the following examples:
  a. Start Tx quadrature correction tracking algorithm;
  b. Start Rx quadrature correction tracking algorithm;
  c. Start sniffer path quadrature correction tracking algorithm;
  d. Start/Stop RF DC offset tracking in Rx and/or sniffer paths;
  e. Start/Stop digital DC offset tracking in DPD path; and
  f. Start/Stop Tx LO leakage correction tracking algorithm.

The two lists above are, by no means, a comprehensive list of control data that may flow between BBP and TRX, but provides a starting point for exemplary types of control data being exchanged on this interface. The amount of control data and its types, and the need to exchange the control data quickly poses a challenge for Serial Peripheral Interfaces. For at least this reason, a fast control interface leveraging a different communication protocol is proposed.

Exemplary Formats of the Control Data: Frame Header and Payload Control Data

The control data signal being transmitted over the fast control interface has two parts: the frame header and the payload control data. This format can be used for both CMOS and LVDS implementations. To accommodate a large number of types of control data being exchanged the frame header has a length of one byte. The frame header comprises one or more bits for specifying the type of payload control data being provided to the control interface part. These bits are referred as the function code. The frame header can include one or more bits for specifying expected size of the payload control data (e.g., number of bytes).

This table illustrates an exemplary format for a frame having 8 bites (one byte):

| D7 | D6 | D5 | D4 | D3 | D2 | D1 | D0 |
|---|---|---|---|---|---|---|---|
| RESERVED | Function Code[4:0] | | | | | Payload size[1:0] | |

In this exemplary format, the frame header is an 8-bit word that supports two logical functions as outlined below.

A 6-bit Function Code—Can support up to 32 possible modes (bit D7 is reserved) for specifying up to 32 possible types of payload control data. Each mode will refer to a particular function or type of payload control data being reported out to the BBP. For e.g., the function code value 0x02 could be used to represent RSSI information for Rx channels 1 and 2.

A 2-bit Payload Size Indicator—This indicator informs the BBP of the total number of payload bytes following the frame header. A table of the possible values for the payload size indicator is shown below.

| Payload Size Indicator | Payload size in bytes |
| --- | --- |
| 00b | 1 |
| 01b | 2 |
| 10b | 4 |
| 11b | 8 |

The table below shows a possible subset of function code values that could be implemented on the control interface from TRX to BBP. The time required for data transfer is based on a 76.8MSPS interface rate. The time required for the 2-byte to 5-byte data transfer for a 2-pin payload bus and a 4-pin payload bus is enumerated in the table below. The data transfer in default mode is LSB first.

| Function Code (6-bit word) | Monitored Function | Contents of payload | Payload Size (bytes) | Time required for data transfer (2-pin payload) | Time required for data transfer (4-pin payload) |
| --- | --- | --- | --- | --- | --- |
| 02 | RSSI for Rx channels | RSSI for both Rx channels (in Decibels relative to full scale (dBFS)) | 4 | 260 nsec | 130 nsec |
| 03 | RSSI (sniffer channel) | RSSI for sniffer channel (in dBFS) | 2 | 156 nsec | 78 nsec |
| 04 | Analog/Digital peak detector threshold exceeded (upper or lower) (Receiver 1 (Rx1)) | Indicates which peak detector on Rx1 was exceeded and whether it was an upper level or lower level threshold. This information will be hot-encoded | 1 | 104 nsec | 52 nsec |
| 05 | Analog/Digital peak detector threshold exceeded (upper or lower) (Receiver 2 (Rx2)) | Indicates which peak detector was exceeded and whether it was an upper level or lower level threshold. This information will be hot-encoded | 2 | 104 nsec | 52 nsec |
| 06 | Digital power measurement | Measurement is in dBFS for both Rx channels | 2 | 156 nsec | 78 nsec |
| 07 | Digital power measurement (sniffer channel) | Measurement is in dBFS for sniffer channel | 1 | 104 nsec | 52 nsec |
| 08 | Gain changed on Rx channels | Indicator showing Rx channel for which the gain changed and new gain index words for both channels. Also, there is a max/min gain index reached indicator | 4 | 260 nsec | 130 nsec |
| 09 | Gain changed on sniffer channel | Indicator showing new gain for sniffer channel and max/min gain reached indicator | 1 | 104 nsec | 52 nsec |
| 0A | DPD/Sniffer signal on JESD output and LNA select on sniffer | Indicator for DPD/sniffer data on serial data interface (JESD) Framer output | 1 | 104 nsec | 52 nsec |
| 0B | Status of TxQEC and Tx LO leakage algorithms | Start/Enable/Pause/Done signals for Tx QEC (Quadrature Error Correction)/Tx Local Oscillator (LO) Leakage on Tx1/Tx2 | 2 | 156 nsec | 78 nsec |
| 0C/0D/0E | Status of RXQEC TCAL and POLY algorithms | Start/Enable/Pause/Done signals for quadrature error correction on Rx/ORx datapaths | 2 | 156 nsec | 78 nsec |
| 0F | Status of RF DC offset and digital DC offset tracking | Start/Enable/Freeze DC offset tracking | 2 | 156 nsec | 78 nsec |

| Function Code (6-bit word) | Monitored Function | Contents of payload | Payload Size (bytes) | Time required for data transfer (2-pin payload) | Time required for data transfer (4-pin payload) |
|---|---|---|---|---|---|
| 10 | Status of Tx attenuation control word | Indicates change in Tx attenuation word via pin control and new Tx attenuation word for Tx1/Tx2 | 4 | 260 nsec | 130 nsec |
| 11 | Upper threshold on peak detectors exceeded | Indicates which of the upper thresholds was exceeded on Rx1, Rx2 and/or sniffer channels | 1 | 104 nsec | 52 nsec |
| 12 | Overflow on control interface buffer | Indicates that an overflow occurred on the control interface buffer and data may be lost | 1 | 104 nsec | 52 nsec |
| 1F | Generic SPI access | Returns the requested for data in address specified by command in BBP->TRX interface | 1, 2, 4, 8 | 104 nsec | 52 nsec |

The above table is by no means a complete set of all the possible supported monitoring functions. More functions or types of control data can be added. Function codes can be assigned to types of control data in different ways depending on the implementation. Also, the user may have the ability to enable/disable any of the monitored functions in the above table.

Each new message will occur with a clear frame demarcation. For the CMOS implementation, the CI_FRM signal will go low (after payload transmission is completed for current frame) for at least two CI_CLK cycles before it goes high again to indicate a new frame is present. Frame demarcation occurs differently for an LVDS implementation, e.g., frame demarcation can be indicated by one or more pre-determined sequence of bits.

If there is a conflict (i.e. two different functions need to report out at the same time), a priority encoding mechanism will be implemented and the higher priority message will be sent out first followed by the lower priority ones. The priority of each function can be configured by the user. This mechanism is explained in detail in FIGS. 11 and 12.

The table below shows a possible subset of function code values that could be implemented on the control interface from BBP to TRX. The time required for data transfer is based on a 76.8MSPS (MSPS=mega samples per second) interface rate. The time required for the 2-byte data transfer for a single pin payload bus and a 2-pin payload bus is enumerated in the table below. Frame demarcation is explained in relation to FIG. 10.

| Function Code (6-bit word) | Function Controlled | Contents of payload | Payload Size (bytes) | Time reqd for data transfer (single pin payload) | Time required for data transfer (2-pin payload) |
|---|---|---|---|---|---|
| 02 | Enable/Disable DPD mode | Enable/Disable capturing DPD data on ORx path (Observation Rx path) and route to BBP | 1 | 208 nsec | 104 nsec |
| 03 | Enable/Disable sniffer mode Rx path | Enable/Disable sniffer mode path and enable/disable data to BBP. Low Noise Amplifier (LNA) selection too occurs here | 1 | 208 nsec | 104 nsec |
| 04 | Sniffer configuration | Gain increment or decrement (incr/decr), DC offset configuration | 1 | 208 nsec | 104 nsec |
| 05 | Tx datapath attenuation | Increment/decrement Tx attenuation words | 1 | 208 nsec | 104 nsec |
| 06 | Rx datapath gain configuration | Incr/Decr Rx1/Rx2 path gain | 1 | 208 nsec | 104 nsec |
| 07 | Start power measurement on Rx | Start a power measurement on Rx path | 1 | 208 nsec | 104 nsec |

-continued

| Function Code (6-bit word) | Function Controlled | Contents of payload | Payload Size (bytes) | Time reqd for data transfer (single pin payload) | Time required for data transfer (2-pin payload) |
|---|---|---|---|---|---|
| 1E | Start Execution at address | Start execution of instructions at data memory address specified | 1 | 208 nsec | 104 nsec |
| 1F | Request for data (generic) | Request for data from SPI accessible registers. Data requested could be either 1, 2, 4 or 8 bytes | 2 | 416 nsec | 208 nsec |

The above table is by no means a complete set of all the possible supported monitoring functions. More functions or types of control data can be added. Function codes can be assigned to types of control data in different ways depending on the implementation. Also, the user may have the ability to enable/disable any of the monitored functions in the above table.

Other alternatives exists for the format of the data. For instance, the LVDS implementation can include a different format (where the payload control data size is not provided). (Although, the CMOS implementation can also utilize the following format.) The payload size is predetermined to be one byte only. The following table illustrates some possible function codes and payload control data format for control data from TRX to BBP.

| Function Code | Name | D7 | D6 | D5 | D4 | D3 | D2 | D1 | D0 |
|---|---|---|---|---|---|---|---|---|---|
| 02 | RSSI Rx (byte 0) | | | | RSSI Rx channel 1[8:1] | | | | |
| 02 | RSSI Rx (byte 1) | | | | RSSI Rx channel 2[8:1] | | | | |
| 02 | RSSI Rx (byte 2) | | | | | | | RSSI Rx ch 2[0] | RSSI Rx ch 1[0] |
| 02 | RSSI Rx (byte 3) | | | | | | | | |
| 03 | RSSI Sniffer (byte 0) | | | | RSSI Sniffer channel[8:1] | | | | |
| 03 | RSSI Sniffer (byte 1) | | | | | | | | RSSI Sniffer ch[0] |
| 04 | Rx Peak detector exceeded ch1 (byte 0) | | | | APD peak (upper) ch1 | APD peak (lower) ch1 | HB2 peak (upper) ch1 | HB2 peak (lower) ch1 | ADC peak (upper) ch1 | ADC peak (lower) ch1 |
| 05 | Rx Peak Detector exceeded ch2 (byte 0) | | | | APD peak (upper) ch2 | APD peak (lower) ch2 | HB2 peak (upper) ch2 | HB2 peak (lower) ch2 | ADC peak (upper) ch2 | ADC peak (lower) ch2 |
| 06 | Sniffer Peak Detector exceeded (byte 0) | | | | APD peak (lower) | HB2 peak (lower) | ADC peak (lower) | APD peak (upper) | HB2 peak (upper) | ADC peak (upper) |
| 07 | Rx Digital power measurement (byte 0) | | | Rx power after decimation channel 1[7:0] (in dBFS) | | | | | |
| 07 | Rx Digital power measurement (byte1) | | | Rx power after decimation channel 2[7:0] (in dBFS) | | | | | |
| 08 | Digital power measurement sniffer (byte 0) | | | Power after decimation (in dBFS) | | | | | |
| 09 | Gain Change Rx channels (byte 0) | | | Gain Rx channel 1[7:0] | | | | | |
| 09 | Gain Change Rx channels (byte 1) | | | Gain Rx channel 2[7:0] | | | | | |
| 0A | Gain Change sniffer channel (byte 0) | | | Gain sniffer channel[7:0] | | | | | |
| 0B | DPD/sniffer data (byte0) | | | | LNA select for sniffer path[1:0] | | Sniffer path data on JESD | DPD data on JESD | Sniffer path enabled (for power meas) | DPD path enabled |
| 0C | TxQEC/TxLOL status (byte0) | TxQEC ch2 Start | TxQEC ch1 Start | TxQEC ch2 Contin | TxQEC ch1 Contin | TxQEC ch2 Pause | TxQEC ch1 Pause | TxQEC ch2 Done | TxQEC ch1 Done |

| Function Code | Name | D7 | D6 | D5 | D4 | D3 | D2 | D1 | D0 |
|---|---|---|---|---|---|---|---|---|---|
| 0C | TxQEC/TxLOL status (byte1) | TxLOL ch2 Start | TxLOL ch1 Start | TxLOL ch2 Contin | TxLOL ch1 Contin | TxLOL ch2 Pause | TxLOL ch1 Pause | TxLOL ch2 Done | TxLOL ch1 Done |
| 0D | Rx QEC TCAL (byte0) | RxQEC lpbk2 cal start | RxQEC lpbk1 cal start | RxQEC ch2 cal start | RxQEC ch1 cal start | RxQEC lpbk2 cal done | RxQEC lpbk1 cal done | RxQEC ch2 cal done | RxQEC ch1 cal done |
| 0D | Rx QEC TCAL (byte1) | | DPD coefs updated | RxQEC DPD cal start | RxQEC DPD cal done | Lpbk2 coefs updated | Lpbk1 coefs updated | Ch2 coefs updated | Ch1 coefs updated |
| 0E | RxQEC POLY (byte0) | | | | | | | | |
| 0F | DC offset (byte0) | DigDC word update | Dig DC word freeze | Dig DC track ON | RFDC ch2 word update | RFDC ch1 word update | RFDC track ON | RFDC cal done | RFDC cal Start |
| 10 | Txatten status (byte0) | | | | Tx atten word ch1[7:0] | | | | |
| 10 | Txatten status (byte1) | | | | | | Tx atten word ch2[9:8] | | Tx atten word ch1[9:8] |
| 10 | Txatten status (byte2) | | | | Tx atten word ch2[7:0] | | | | |
| 11 | Upper Threshold PD exceeded | APD peak sniffer (upper) | HB2 peak or ADC peak sniffer (upper) | APD peak (upper) ch2 | HB2 peak (upper) ch2 | ADC peak (upper) ch2 | APD peak (upper) ch1 | HB2 peak (upper) ch1 | ADC peak (upper) ch1 |
| 12 | Buffer limit exceeded | | | | | | | | Buffer overflow |
| 1F | Response to Request for data | | | | Data from register on SPI[7:0] | | | | |

The following table illustrates some possible function codes and payload control data format for control data being transmitted from BBP to TRX.

| Function Code | Name | D7 | D6 | D5 | D4 | D3 | D2 | D1 | D0 |
|---|---|---|---|---|---|---|---|---|---|
| 02 | DPD path control | Disable RF DC track | Enable RF DC track | Update dig DC track word | Freeze digital DC word | Enable dig DC tracking | DPD data to output | DPD path disable | DPD path enable |
| 03 | Sniffer path control | Sniffer path disable | Rx PFIR coef config[1:0] (allows selection of 1 from 4 sets of coefs) | | LNA select on sniffer path[1:0] | | Sniffer path power meas enable | Sniffer data to output | Sniffer path enable |
| 04 | Sniffer path control | | Disable RF DC track | Enable RF DC track | Update dig DC track word | Freeze digital DC word | Enable Dig DC tracking | Decr gain | Incr gain |
| 05 | Tx attenuation | | | Goto max atten ch2 | Goto max atten ch1 | Decr Tx atten ch2 | Decr Tx atten ch1 | Incr Tx atten ch2 | Incr Tx atten ch1 |
| 06 | Rx path control | | | Goto min gain ch2 | Goto min gain ch1 | Decr gain ch2 | Decr gain ch1 | Incr gain ch2 | Incr gain ch1 |
| 07 | Rx path gain control ch1 | | | | New gain index for ch1[7:0] | | | | |
| 07 | Rx path gain control ch2 | | | | New gain index for ch2[7:0] | | | | |
| 1E | Start Execution at address | | | | Data Memory offset address[7:0] | | | | |
| 1F | Request for data (byte 1) | | | | SPI register address[7:0] | | | | |
| 1F | Request for data (byte 2) | | | | | | | | SPI register address[10:8] |

Special Function Codes

One important function code for the fast control interface is the function code which initiates the execution of instructions stored at a particular address (e.g., using a function code to indicate "start execution at address"). Using this function code, the fast control interface can allow a first device to instruct a processor in a signal processing part of a second device to kick off a series of commands/instructions in the second device to accomplish a certain function. Conventionally, this is done through a series of SPI writes to the second device which takes an inordinately long time. To change internal configurations on the second device, or to change the filter coefficients of programmable filters in the second device, or, e.g., to move from Rx to Tx mode in a TDD applications, a particular series of SPI writes needs to be done, which could take up to 100 usec or more.

To support this function code, the signal processing part comprises one or more processors and one or more memories. The payload control data comprises a memory address; and the frame header comprises a function code specifying a request for the one or more processors to start execution of the instructions at the memory address specified by the payload control data.

With this interface, this kind of communication can simply point to the start address in the second device's memory where the sequence of commands/instructions is stored. The special function code indicates to the processor that the payload contains an address from which execution needs to start. The processor reads this address and kicks off the sequence of commands to execute the required function. The duration now to accomplish the same function is within 1-2 usec as opposed to 100 usec or more using the SPI port. Some examples of functions that could be implemented are changing configuration of DPD path, update filter coefficients on Rx/Tx, change local oscillator frequency on Rx/Tx, change update rate of DPD observation path.

Using a different special function code, a first device can request data from registers in a second device that are SPI accessible (e.g., using a function code to indicate "request for data"). The first device can use the function code and provide the address of the SPI register along with number of register reads required starting from that SPI address. The possible values are 1, 2, 4 or 8 bytes (although other values are envisioned). This special function code allows a first device to specify a set or sequence of SPI reads and writes that could be stored in memory (of the signal processing part) in the second device. Some examples of functions that could be implemented are changing LO frequency for sniffer path, changing configuration of Tx/Rx or sniffer datapath, re-programming of programmable finite impulse response filters (PFIRs) (such as RxPFIR or TxPFIR) on the fly, etc.

To support this special function code, the signal processing part comprises one or more memories and the payload control data comprises a memory address and a number of memory reads. The frame header comprises a function code specifying a request for data stored at the memory address in the one or more memories, and the control interface part comprises one or more control data output lines for providing the data stored at the memory address (e.g., and the one or more control data output lines can output the data stored in the SPI accessible registers). While SPI has a streaming mode which allows an instruction to read from a particular memory address, this mode is extremely slow when compared to this implementation using the special function code.

Special Format of the Control Data: Low Latency Mode

To accommodate control data which is time sensitive, i.e., control data which must be transmitted quickly enough for real-time control, a special frame header can be used which may allow the payload control data to be provided within the frame header itself. One example of such low latency control data involves control data for gain loop. For extremely low latency applications like gain control, a mode is built in that allows payload to be included as part of the frame header itself. This mode is enabled/unlocked using the reserved D7 bit in the frame header byte. The 'reduced set function code' is 3-bits wide and allows for up to 8 possible payloads to be transmitted from TRX to BBP in this low latency mode. The table below shows the format of the frame header in this mode.

| D7 | D6 | D5 | D4 | D3 | D2 | D1 | D0 |
|----|----|----|----|----|----|----|----|
| 1 | Function Code[2:0] | | | Payload control data[3:0] | | | |

As seen in the table above, the frame header comprises a flag for low latency payload control data (bit D7), wherein at least a part of the payload control data is provided as part of the frame header. This mode would allow for quick transfer of time critical data, e.g., ADC peak detected, HB2 peak detected, Analog Peak Detector (APD) peak detected (PD), etc., for fast gain control of the Rx data paths.

For BBP to TRX communications, the low latency mode can be activated in the same way (bit D7 is 1) and can be used to indicate gain changes on the TRX via a single byte transmission. The BBP to TRX low latency communications can be used to indicate changes in Rx front end gain, Tx attenuation changes, etc.

The following table illustrates exemplary low latency TRX to BBP communications where the payload control data is provided as part of the frame.

| Function Code | Name | D3 | D2 | D1 | D0 |
|---|---|---|---|---|---|
| 00 | High ovld Rx1 | | APD upper PD | ADC upper PD | HB2 upper PD |
| 01 | High ovld Rx2 | | APD upper PD | ADC upper PD | HB2 upper PD |
| 02 | High ovld sniffer | | APD upper PD | ADC upper PD | HB2 upper PD |
| 03 | RESERVED | | | | |
| 04 | RESERVED | | | | |

The following table illustrates exemplary low latency BBP to TRX communications where the payload control data is provided as part of the frame.

| Function Code | Name | D3 | D2 | D1 | D0 |
|---|---|---|---|---|---|
| 00 | Incr gain Rx | Rx1 = 0 Rx2 = 1 | | Incr gain step[2:0] (each LSB corresponds to x gain indices in gain table) | |
| 01 | Decr gain Rx | Rx1 = 0 Rx2 = 1 | | Decr gain step[2:0] (each LSB corresponds to x gain indices in gain table) | |
| 02 | Incr/Decr gain sniffer | Decr = 0 Incr = 1 | | Incr/Decr gain step[2:0] (each LSB corresponds to x gain indices in gain table) | |
| 03 | Tx atten incr | Tx1 = 0 Tx2 = 1 | | Incr step in Tx atten table[2:0] (each LSB corresponds to x indices in atten table) | |
| 04 | Tx atten dec | Tx1 = 0 Tx2 = 1 | | Decr step in Tx atten table[2:0] (each LSB corresponds to x indices in atten table) | |

CMOS Compatible Fast Control Interface: TRX to BBP and BBP to TRX

Figure 2:
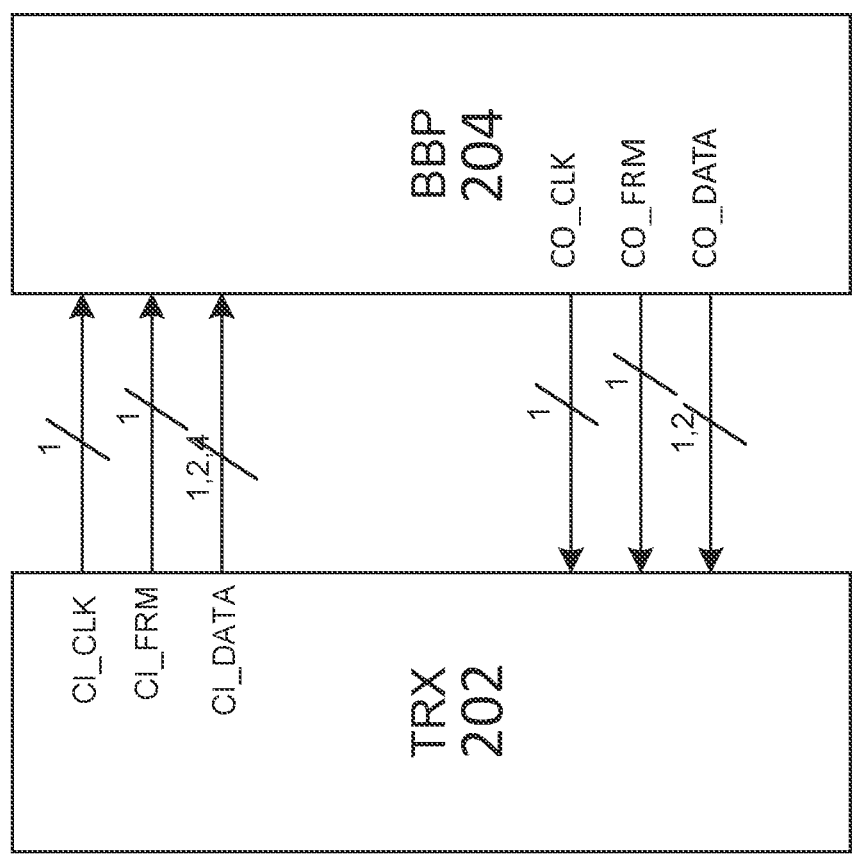
FIG. 2 shows an illustrative a Complementary metal-oxide-semiconductor (CMOS) compatible fast control interface, according to some embodiments of the disclosure.

FIG. 2 shows an illustrative a Complementary metal-oxide-semiconductor (CMOS) compatible fast control interface, according to some embodiments of the disclosure. In this CMOS implementation, a minimum of three pins are can be used for input: a clock input, a framing input, and one or more control data input lines. A minimum of three pins can be used for output: a clock output, a framing output, and one or more control data output lines. For instance, a 3-wire interface would include one clock signal, one framing signal, and one control data input/output line. In another instance, a 4-wire interface would include one clock signal, one framing signal, and two control data input/output lines. In another instance, a 5-wire interface would include one clock signal, one framing signal, and three control data input/output t lines. In another instance, a 6-wire interface would include one clock signal, one framing signal, and four control data input/output lines. More control data input/output lines can be included at the cost of increasing the pin count of the interface but may benefit from being able to transmit control data more quickly. Depending on the implementation, the number of pins/wires used can vary. A fast control interface having one or more control data input lines can include up to four data input lines for receiving payload control data in parallel.

A device supporting the CMOS interface may include a control interface part; and a signal processing part. The control interface part has a framing input and one or more control data input lines (making up the receive interface for the control interface part). It is also envisioned that the device supporting the CMOS interface can provide a transmit interface in the control interface part. The complementary receive and transmit interfaces allows closed-loop operation between the device and the other device to which the control interface interfaces. The transmit interface would include a framing output and one or more control data output lines.

A framing signal at the framing input triggers the control interface part to receive, over the one or more control data input lines, a frame header and payload control data for controlling the signal processing part. In some embodiments, a framing signal indicates to a receiving interface of the (receiving) device that there is a transmission about to occur on the control data lines. Within the context of the disclosure, the device can be any one of the following: a baseband processor, a transmitter, a receiver, and a transceiver. The control interface part interfaces with another device, which can be any one of the following: a baseband processor, a transmitter, a receiver, and a transceiver.

In this example shown in FIG. 2, TRX 202 can drive (up to) six single-ended signals using its transmit interface of the control interface part in TRX 202 (where the signals are received by a receive interface of the control interface part in BBP 204):

Control Interface Clock (CI_CLK);
Control Interface Framing signal (CI_FRM); and
Control Interface Data signal (CI_DATA, CI_DATA[3:0] in this example, where the data signal is driven over three lines).

The CI_CLK signal is generated by the TRX 202 and sent to the BBP 204 as a reference clock. This clock signal is used by the BBP 204 as a timing reference for the CI_DATA signal. The CI_CLK provides source synchronous rising (or falling) edge capture for the CI_DATA signal. The control interface part of the device can include a clock input for clocking the frame header and the payload control data being provided over the one or more control data input lines. The interface clock (CI_CLK) can be an integer divide ratio of the output sample rate clock. The divide ratio includes divide-by-1, divide-by-2 and a divide-by-4. Based on the output sample rate, and the requirements of the BBP 204, an appropriate CI_CLK rate can be chosen, e.g., up to 100 MHz. The CI_CLK and CI_DATA is driven by the TRX 202 such that the setup and hold times between CI_CLK and CI_DATA arriving at the BBP allow the BBP to use CI_CLK to sample CI_DATA. For instance, the timing diagram in FIG. 3 shows this behavior.

Figure 3:
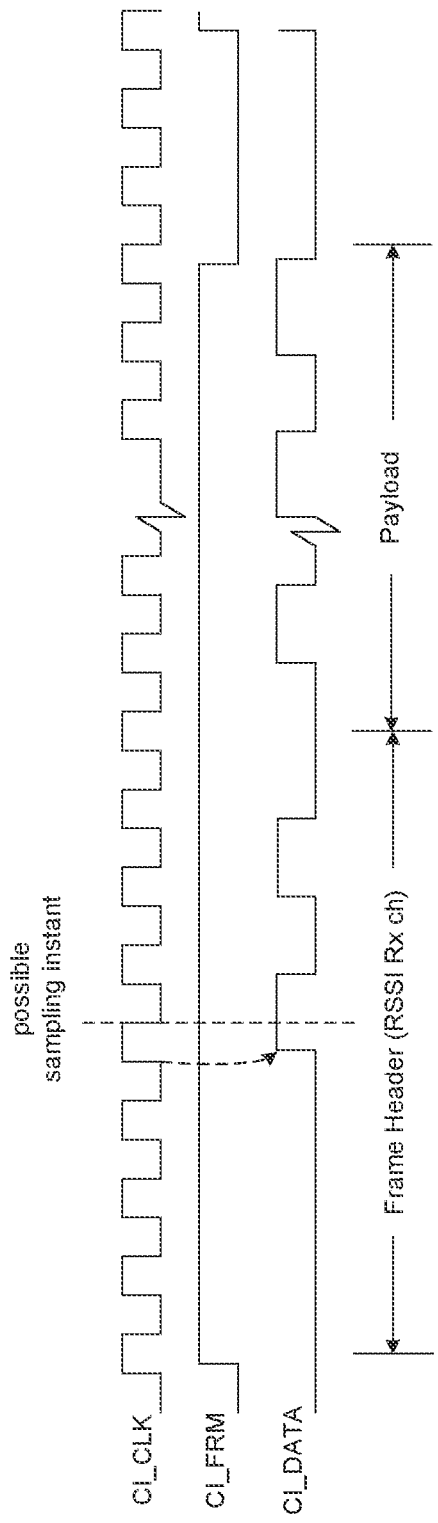
FIG. 3 shows an illustrative functional timing diagram for a 3-wire interface for control signaling from TRX to BBP, according to some embodiments of the disclosure.

FIG. 3 shows an illustrative functional timing diagram for a 3-wire interface for control signaling from TRX to BBP, according to some embodiments of the disclosure. CI_DATA is configured to transmit a frame header and payload control data. The control interface framing signal (CI_FRM) is driven from the TRX 202 and indicates an ongoing data transfer from TRX 202 to BBP 204. In this example, the control interface part has a mode of operation where the control interface part is triggered to begin receiving the frame header in response to a state change of the framing signal and continues to receive payload control data as long as the framing signal remains in a predetermined state. The state change can include a high transition or a low transition, depending on the implementation. If a high transition indicates 'Start of Frame', when CI_FRM is high, control data is sent on CI_DATA in a predetermined format. Once the transmission is complete, the CI_FRM goes low. The opposite can occur. If a low transition indicates 'Start of Frame', when CI_FRM is low, control data is sent on CI_DATA in a predetermined format. Once the transmission is complete, CI_FRM goes high.

For the three-wire interface (as illustrated by the functional timing diagram of FIG. 3), BBP 204 can sample on the falling edge of CI_CLK. In this illustration, the frame header is 1-byte long. The payload control data (4 bytes of data) follows the frame header after which the CI_FRM signal transitions to low. If there is another transfer ready to occur, the CI_FRM goes high after staying low for two CI_CLK cycles. The frame header in this example is 0x0A which results in a function code of 0x02 and a payload size indicator of 0x02 to indicate 4 bytes of payload control data. Details of control data format, i.e., the frame header and payload control data, are described in a later section of this disclosure.

Figure 4:
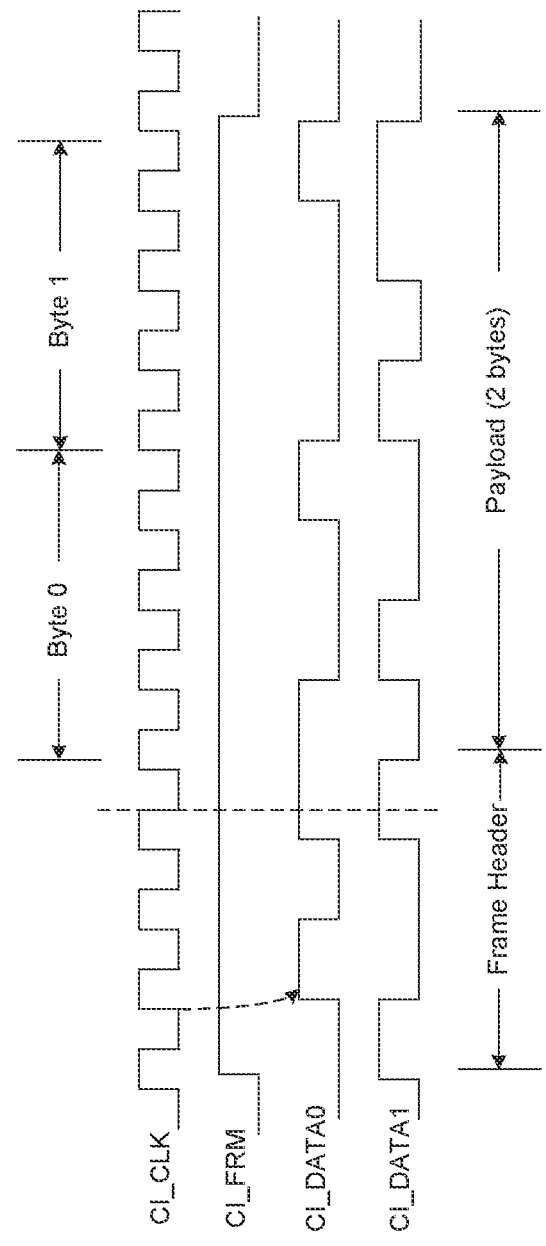
FIG. 4 shows an illustrative functional timing diagram for a 4-wire interface for control signaling from TRX to BBP, according to some embodiments of the disclosure.

FIG. 4 shows an illustrative functional timing diagram for a 4-wire interface for control signaling from TRX to BBP, according to some embodiments of the disclosure. In this embodiment, 2 wires are used for transmitting control data. CI_DATA0 transmits the first bit (either LSB or MSB of the frame header byte depending on little-endian or big-endian format), and CI_DATA1 transmits the second bit, in parallel with CI_DATA0.

Figure 5:
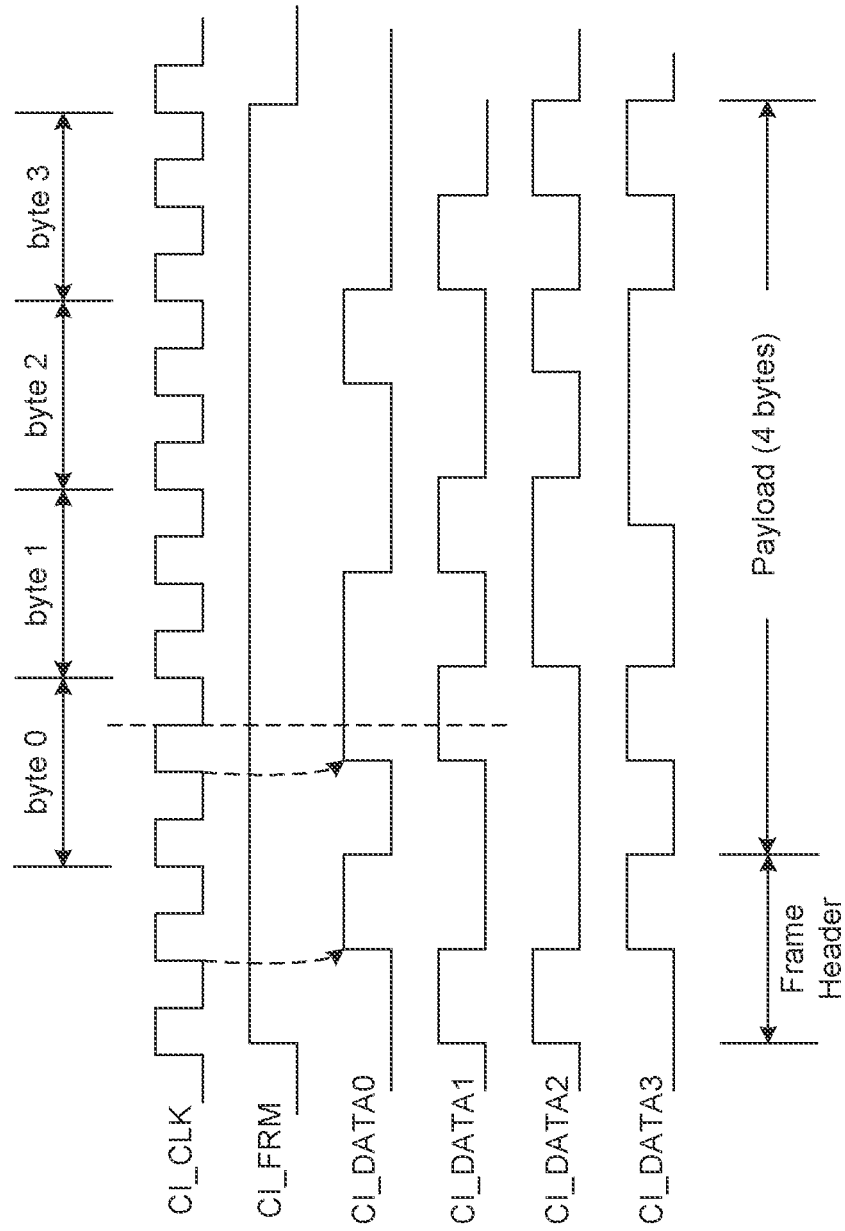
FIG. 5 shows an illustrative functional timing diagram for a 6-wire interface for control signaling from TRX to BBP, according to some embodiments of the disclosure.

FIG. 5 shows an illustrative functional timing diagram for a 6-wire interface for control signaling from TRX to BBP, according to some embodiments of the disclosure. In this embodiment, 4 wires are used for transmitting control data. CI_DATA0 transmits the first bit (either LSB or MSB of the frame header byte depending on little-endian or big-endian format), CI_DATA1 transmits the second bit, in parallel with CI_DATA0, CI_DATA2 transmits the third bit, in parallel with CI_DATA0 and CI_DATA1, and CI_DATA3 transmits the fourth bit, in parallel with CI_DATA0, CI_DATA1, and CI_DATA2.

In this example in FIG. 2, BBP 204 can drive (up to) six single-ended signals using a transmit interface of the control interface of BBP 204 (where the signals are received by the receive interface of the control interface part of TRX 202):

Control Interface Baseband Clock (CO_CLK) and
Control Interface Baseband Framing signal (CO_FRM); and
Control Interface Baseband Data signal (CO_DATA, CO_DATA[1:0] in this example, where the signal is driven over 2 lines).

Figure 6:
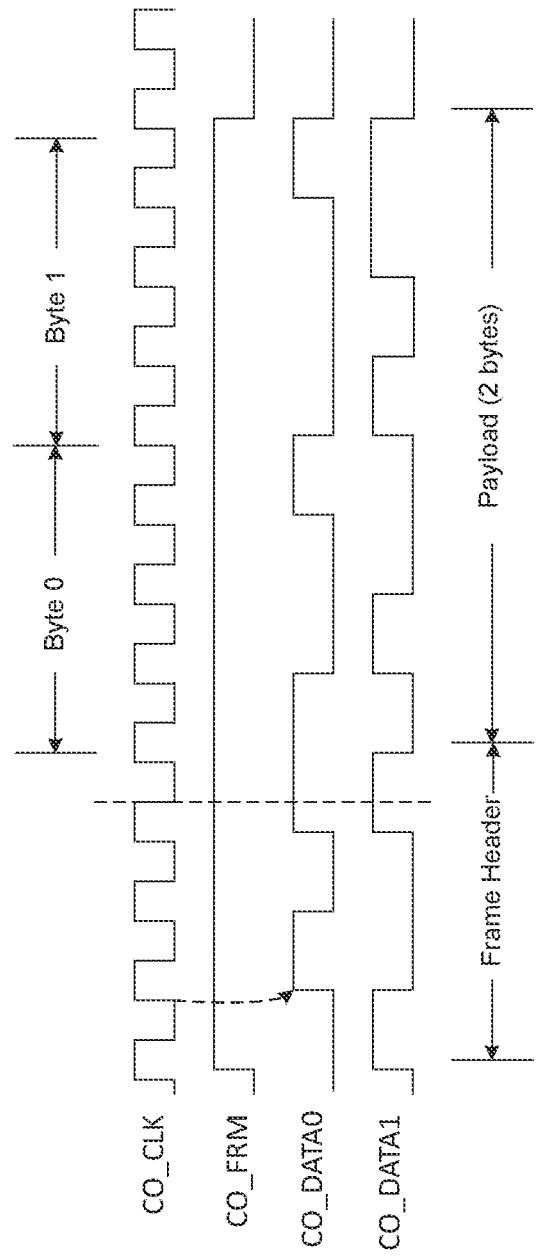
FIG. 6 shows an illustrative functional timing diagram for a 4-wire interface for control signaling from BBP to TRX, according to some embodiments of the disclosure.

The CO_CLK runs at the same rate as the CI_CLK. This is driven from the BBP to the TRX. CO_CLK allows source-synchronous timing with rising edge capture for the framing (CO_FRM) and data signal (CO_DATA[1:0]). There are no timing requirements between the CI_CLK and the CO_CLK. CO_FRM is driven by the BBP to indicate a new payload is being transmitted from BBP to TRX. A low-to-high transition indicates start of data transfer. Once the transmission is complete, the CO_FRM goes low. The opposite can also be supported depending on the implementation, where a high-to-low transition indicates a start of data transfer. Once the transmission is complete, the CO_FRM goes high. CO_DATA[1:0], in one example, is a 2-bit data interface that carries the frame header (to identify content of payload) and the payload control data. The TRX can be configured to receive data only on one pin i.e. CO_DATA[0] or on both pins. This interface protocol is illustrated in FIG. 6 where an illustrative functional timing diagram is shown for a 4-wire interface for control signaling from BBP to TRX, according to some embodiments of the disclosure. TRX has the ability to sample on the falling edge of the CO_CLK.

While the types of control data being provided from BBP 204 to TRX 202 most likely differ from the types of control data being provided from TRX 202 to BBP 204, it is understood that these signals driven by BBP 204 and the wires interface can be implemented in the same way (obeying similar timing protocols) as the signals driven by TRX 202. Less data lines can be used for BBP 204 because the BBP has less controls signals to transmit to the TRX 202. It is envisioned that this control interface part (either or in both TRX 202 and BBP 204) can use any suitable number of lines for the control input data lines and any suitable number of lines for the control output data lines.

Alternative Framing Modes

In the previous examples, the framing signal is held high during the transmission of control data in the CMOS compatible fast control interface. However, other framing modes are possible.

Figure 7:
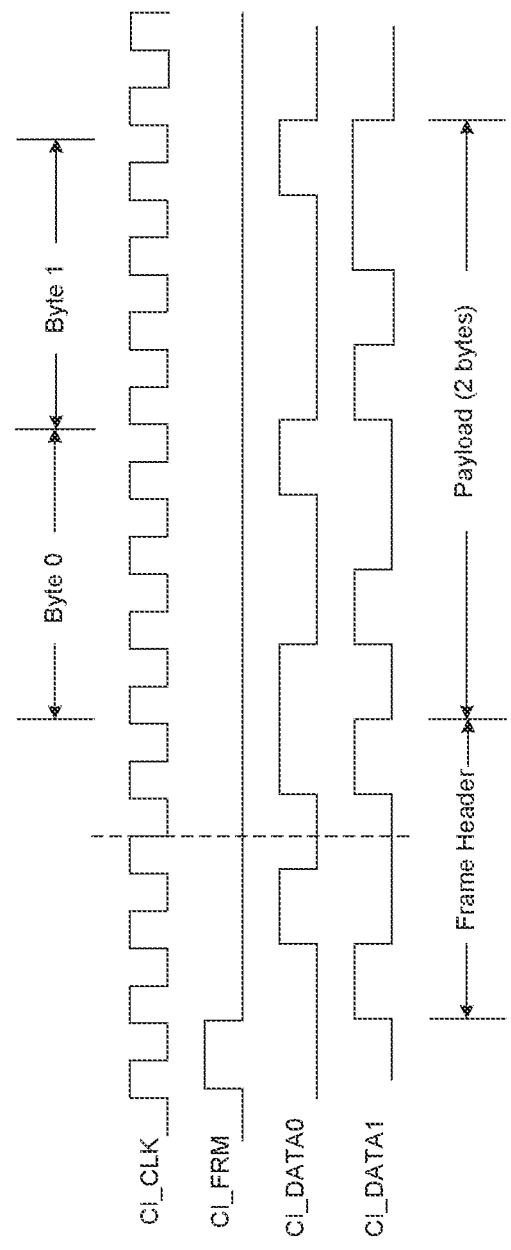
FIG. 7 shows an illustrative functional timing diagram for a 4-wire interface in alternative mode of operation, according to some embodiments of the disclosure.

FIG. 7 shows an illustrative functional timing diagram for a 4-wire interface in alternative mode of operation, according to some embodiments of the disclosure. This alternative mode is referred herein as the pulse mode. In this mode, the frame signals (e.g., CI_FRM and CO_FRM) are pulsed high (or low, depending on the implementation) to indicate start of a data transmission. Data transfer starts on the next rising edge of the CI_CLK after the CI_FRM goes high. The control interface part is triggered to begin receiving the frame header in response to a single pulse in the framing signal. In this mode, the control interface part may be required to process the frame header to extract an expected size of the payload control data and continues to receive payload control data until the control interface part has received the expected size of the payload control data.

Figure 8:
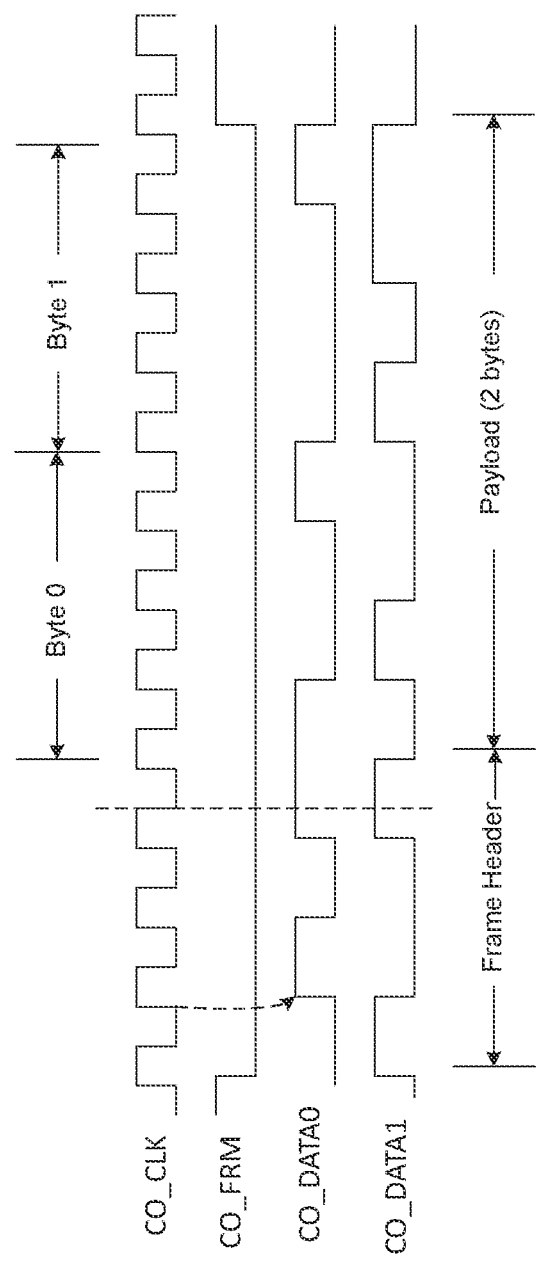
FIG. 8 shows an illustrative functional timing diagram for a 4-wire interface in another alternative mode of operation, according to some embodiments of the disclosure.

FIG. 8 shows an illustrative functional timing diagram for a 4-wire interface in another alternative mode of operation, according to some embodiments of the disclosure. This alternative mode is referred herein as the "active low" mode. In this mode, the frame signal (e.g., CI_FRM and CO_FRM) is an active low signal. When CI_FRM goes low, this indicates to the BBP that the frame header is available on the control data input line(s) (e.g., CI_DATA0 and CI_DATA1) and data transfer starts on the falling edge of the CI_FRM signal.

LVDS Compatible Fast Control Interface: TRX to BBP and BBP to TRX

Figure 9:
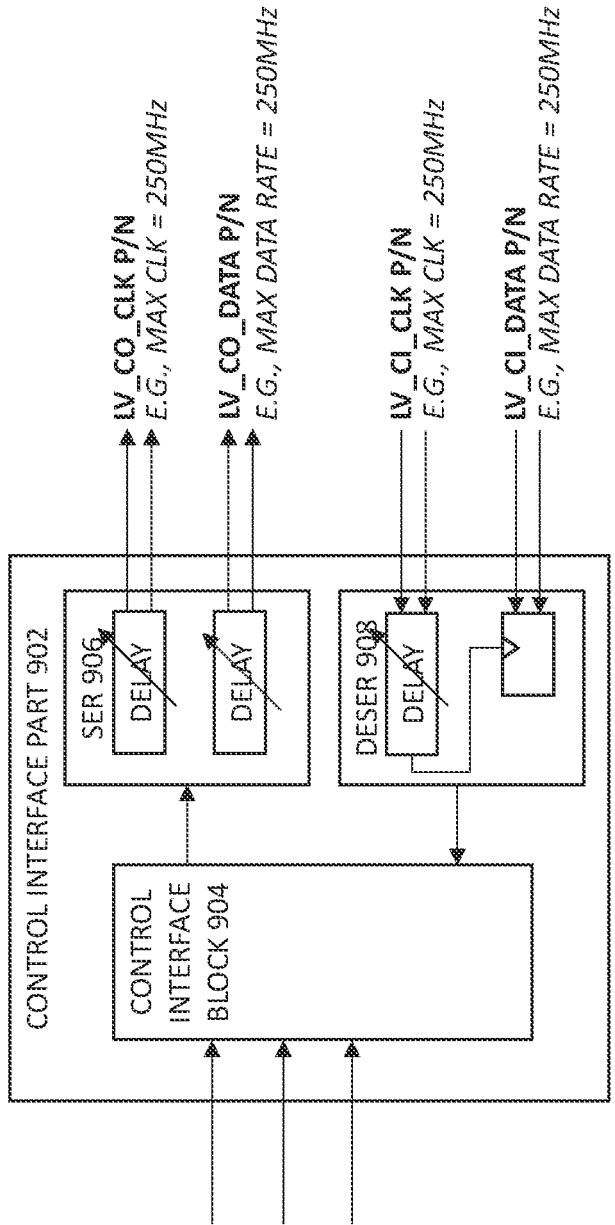
FIG. 9 shows an illustrative a Low-Voltage Differential Switching (LVDS) compatible fast control interface, according to some embodiments of the disclosure.

FIG. 9 shows an illustrative a Low-Voltage Differential Switching (LVDS) compatible fast control interface, according to some embodiments of the disclosure. This interface may be used for other suitable types of physical layer protocols involving differential signaling at rates which are higher than rates used in the CMOS interface. The control interface part 902 is adapted to support LVDS. The serial interface can include a differential control data input, for receiving a control signal comprising a frame header and payload control data for controlling a signal processing part of a device, and a differential clock input for clocking the control signal into a control interface part of the device. The differential control data input and the differential clock input make up a receive interface of the control interface part. Similarly, the serial interface can include a differential control data output, for transmitting a control signal comprising a frame header and payload control data for controlling a signal processing part of another device, and a differential clock output for clocking the control signal into a control interface part of the other device. The differential control data output and the differential clock output makes up the transmit interface of the control interface part. A control interface block 904 is provided to generate and/or process control signals. A serializer 906 (part of the transmit interface) is provided to serialize the control data onto the control data output lines (as a serial control data signal). A deserializer 908 (part of the receive interface) is provided to deserialize the received control data (convert a serial control data signal into segmented data suitable for forwarding onto the control interface block 904). The received control data may be stored in a buffer (temporarily) to allow the deserializer to deserialize the received control data.

In this implementation, control data output may be implemented with four lines to transport two differential signals (LV_CO_CLK P/N and LV_CO_DATA P/N). Control data input can be implemented with four lines to transport two differential signals (LV_CI_CLK P/N and LV_CL_DATA P/N). A total of 8 pins/wires are in this interface. The LVDS interface requires four pins for reporting data from one device to another device and four pins for receiving commands from the other device. These pins are mutually exclusive with the CMOS interface pins. Both the interfaces cannot be used at the same time. It is envisioned, however, that more lines can be used for transporting data, at the cost of higher pin count.

The LVDS interface is a source synchronous interface with 2 pins for clock and 2 pins for data in each direction. The LVDS interface will support a maximum data rate of 500MSPS (mega samples per second) or even as high as 1000MSPS (DDR). The maximum clock rate on the interface can be over 100 MHz and up to 250 MHz or even as high as 500 MHz (higher clock rates can also be supported). The delay for the output clock and data signals (LV_CO_CLK and LV_CO_DATA) are SPI programmable. The delay on the input clock (LV_CI_CLK) is also SPI programmable. The control interface block 904 can include test mode that will receive data from a device and loop back the same pattern back to the device.

Similar to the CMOS interface, the data can be transmitted MSB first or LSB first (little endian format).

Figure 10:
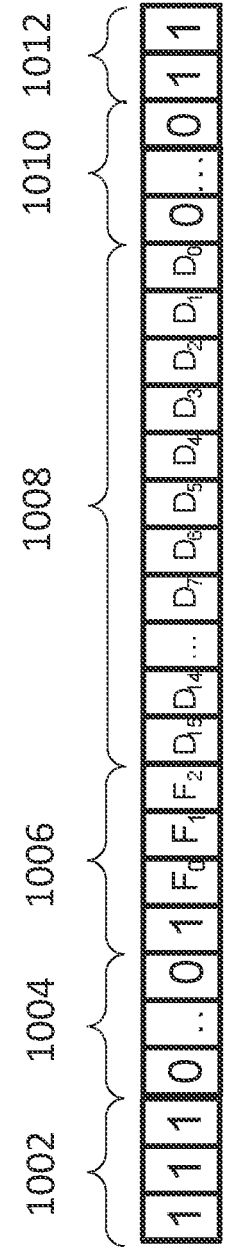
FIG. 10 shows an illustrative control data transmission protocol for the control signal used in LVDS compatible fast control interface, according to some embodiments of the disclosure.

FIG. 10 shows an illustrative control data transmission protocol for the control signal used in LVDS compatible fast control interface, according to some embodiments of the disclosure. A set of predetermined sequences of bits are used for frame demarcation. The serializer is configured to generate the first predetermined sequences of bits, followed by the frame header and the payload control data, and the last predetermined sequence of bits to complete the transmission of the control data. The deserializer operates to provide the opposite function of interpreting the predetermined sequences of bits and unwrap the frame header and the payload control data.

When the link is not in use, the serializer can stuff 1's into the data interface (bits 1002). In other words, the control signal then include a first predetermined sequence of bits to indicate an idle state of the differential control data input.

Furthermore, the control signal would include a second predetermined sequence of bits to indicate a start of the frame header to be transmitted in the control signal over the differential control data input. When a valid control stream of data needs to be transmitted by the device, a SPI programmable number of 0's (bits 1004) can be sent on the data pins before valid data is sent. Then, optionally, a nibble of known data (bits 1006) is sent starting with 1 (e.g., 1, $F_0$, $F_1$ and $F_2$). $F_0$, $F_1$ and $F_2$ bits are user-programmable bits for future proofing the protocol. For instance, $F_0$, $F_1$ and $F_2$ can be used as parity bits for the payload control data.

The control signal would then include, after providing the second predetermined sequence of bits, the data bits (1008) comprising the frame header and corresponding payload which could be 1, 2, 4 or 8 bytes long.

After the payload has been transmitted, a SPI programmable number of 0's (bits 1010) is sent. The control signal a third predetermined sequence of bits following the payload control data to indicate the end of the payload control data.

After the third predetermined sequence of bits, the interface goes to an idle state where 1's (bits 1012) are sent out as the control signal until the next time control data needs to be sent on the interface.

Exemplary Flow of Control Data and Transmission: TRX to BBP

Figure 11:
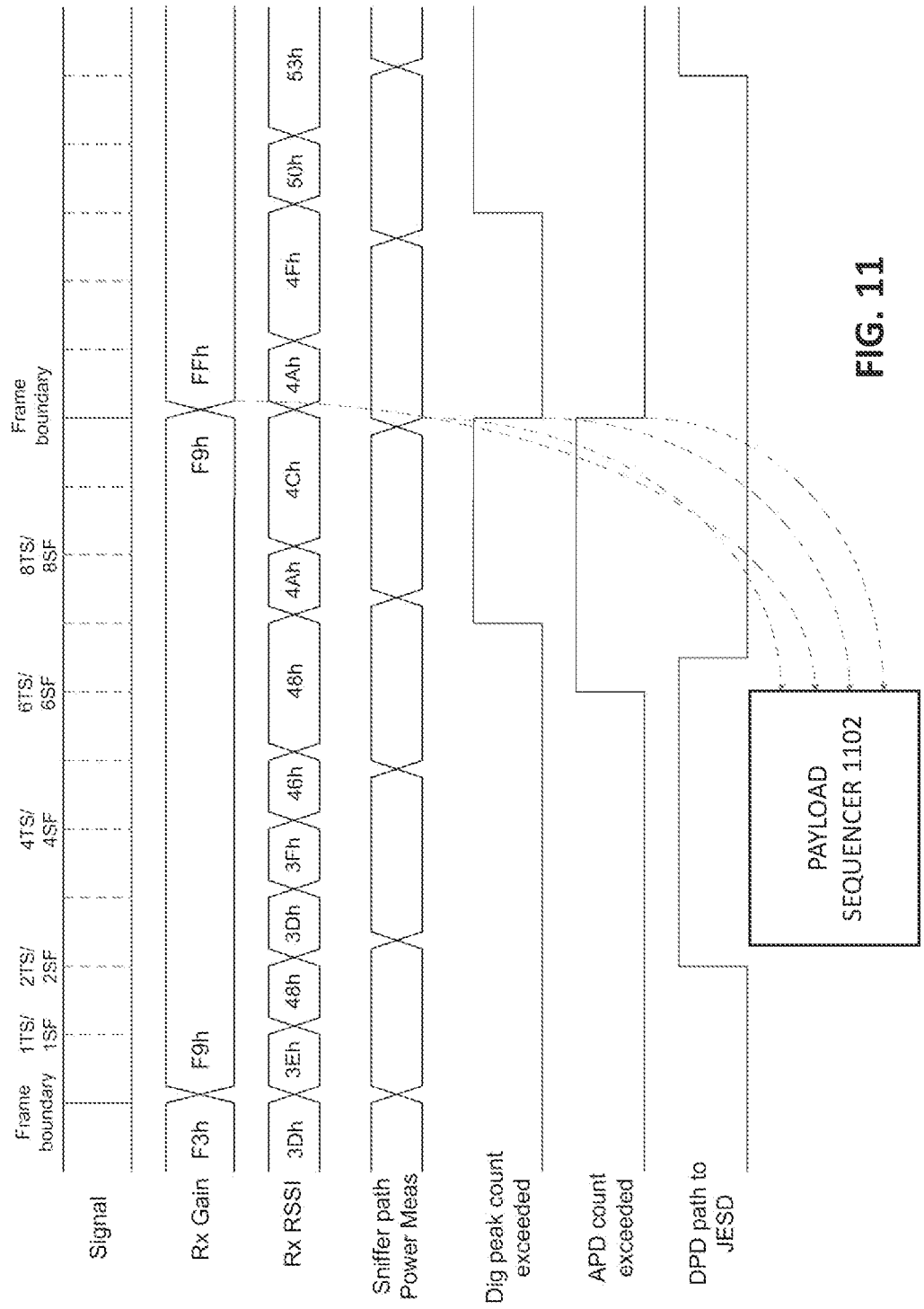
FIG. 11 shows illustrative signal measurements in a transceiver that may be communicated to a baseband processor over a fast control interface, according to some embodiments of the disclosure.

FIG. 11 shows illustrative signal measurements in a transceiver that may be communicated to a baseband processor over a fast control interface, according to some embodiments of the disclosure. Specifically, FIG. 7 illustrates a typical operating mode for a Frequency Division Duplex (FDD) transceiver where continuous measurements are occurring on the receiver (Rx) and this data needs to be reported to the BBP. Using the fast control interface defined herein, the diagram show operation for a Universal Mobile Telecommunications System (UMTS) or Long Term Evolution (LTE) received signal at the TRX Rx. The Rx gain word, Rx RSSI, Sniffer path power measurements, digital peak detector count exceeded, APD (analog peak detector) count exceeded and DPD path enabled/disabled are some of the pertinent signaling information that may be of interest to the BBP.

Figure 12:
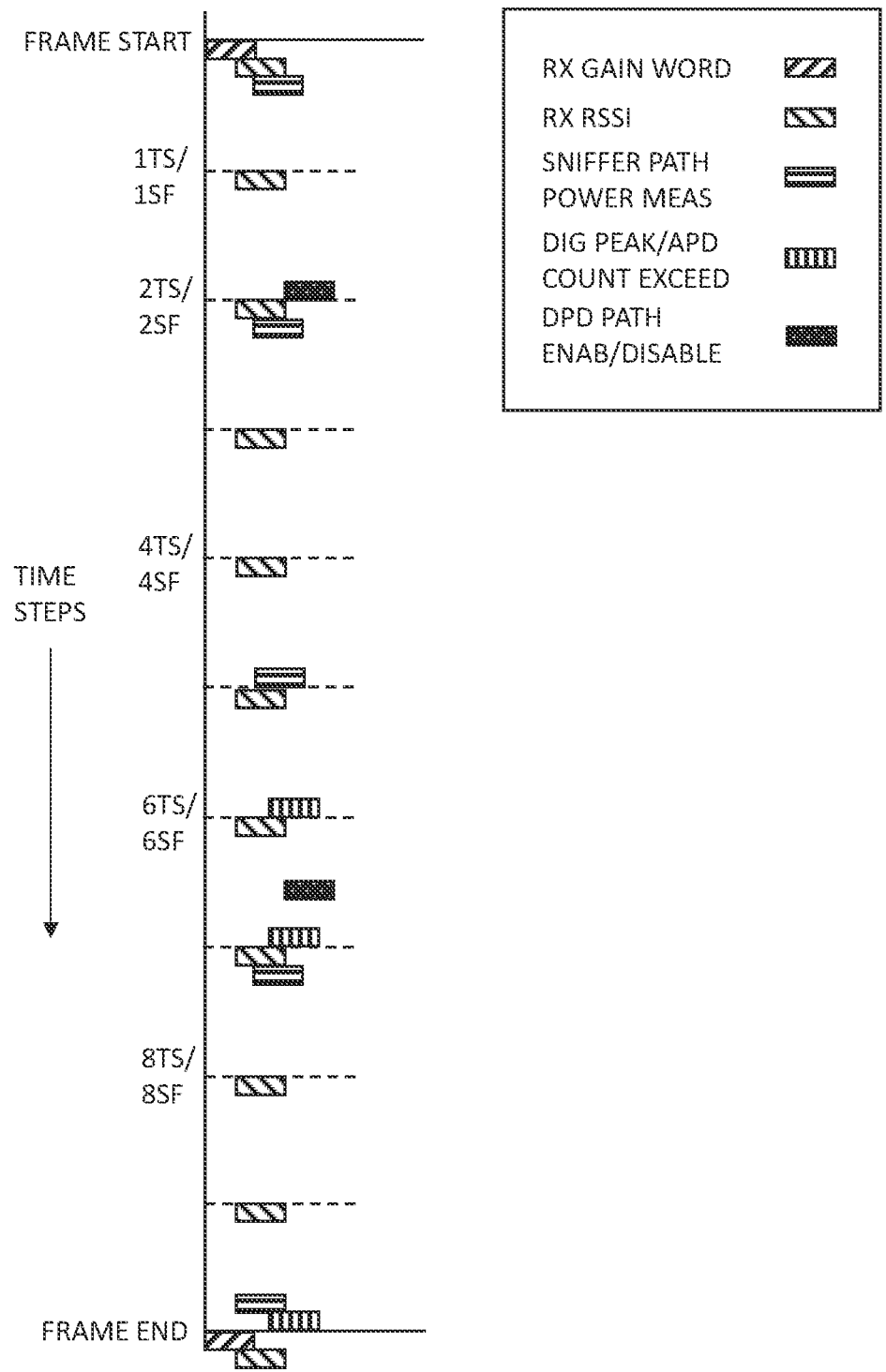
FIG. 12 shows illustrative signal measurements in a transceiver which may be sequenced before being communicated over the fast control interface to a baseband processor, according to some embodiments of the disclosure.

FIG. 12 show illustrative signal measurements in a transceiver are shown, and these signal measurements (such as the ones shown in FIG. 11) may be sequenced before being communicated over the fast control interface to a baseband processor, according to some embodiments of the disclosure. Rx RSSI information is ready at the end of a time slot boundary. Gain word information changes at the frame boundary, and hence is transmitted to the BBP only when a new word is applied to the Rx chain in the TRX. The calculation of a new power measurement in the sniffer path is the trigger to send this new word to the BBP.

If there are multiple pieces of data (for e.g. at the end of the frame duration, there is a new sniffer power measurement word calculated, a new Rx RSSI word ready, a new gain word applied, etc.), they need to be sequenced and transmitted out to the BBP based on a previously set priority. The payload sequencer 1102 shown in FIG. 11 can handle multiple "ready" signals, each of which indicates a measurement is done or new data is available. The payload sequencer 702 can look-up its internal priority list and sequence the reporting to the BBP based on that priority list.

A buffer can be provided to support a maximum of eight (or more) distinct pieces of information that needs to be reported out. If more than 8 pieces of data come in at the same time, the control block will indicate that a buffer overflow has occurred and data may have been lost. For instance, the indicator for buffer overflow would be via function code 12h on the TRX to BBP control bus.

Exemplary Application: Manual Gain Control

Manual control of gain can be achieved via the fast control interface, in particular, via the closed-loop interface which allows fast transmission of control data going from TRX to BBP and from BBP to TRX. A typical operating example for gain control via this interface is described below.

As an example, the operation of an externally controlled Automatic Gain Control (AGC) loop with estimated time durations for each function is explained. All internal processing on the TRX is assumed to be running at Fclk of 245.76 MHz and the interface clk (F_intclk) is assumed to run at 61.44 MHz. The TRX to BBP control uses the 6-wire interface and the BBP to TRX control is through a 4-wire interface.

A large blocker signal overloads the front-end of the receiver

This triggers a stream of overloads on the peak detectors (assume that detection of a large signal overload requires the peak detector to trigger N times within a given duration)

Internal counter for peak detector is triggered (1 Fclk cycle)

Control interface prepares packet for transmission (2 Fclk cycles)

Control interface transmits data to BBP (4 F_intclk cycles)

BBP processes reported information (N_BBP Fclk cycles)

BBP transmits gain change signal to TRX (8 F_intclk cycles)

TRX decodes transmission and changes gain (2 Fclk cycles)

The total time for the whole operation is T_total=(3+N+2) Fclk cycles+12 F_intclk cycles, which means T_total=(216+ N/(245×10^6)). Therefore, the total time for data processing and transmission over control interface is 216 nsec in this configuration (excluding time required by BBP). This speed is far superior to conventional control interfaces.

Variations and Exemplary Implementations

In the discussions of the embodiments above, the capacitors, clocks, DFFs, dividers, inductors, resistors, amplifiers, switches, digital core, transistors, and/or other components can readily be replaced, substituted, or otherwise modified in order to accommodate particular circuitry needs. Moreover, it should be noted that the use of complementary electronic devices, hardware, software, etc. offer an equally viable option for implementing the teachings of the present disclosure.

In one example embodiment, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), computer-readable non-transitory memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In various embodiments, the functionalities described herein may be implemented in emulation form as software or firmware running within one or more configurable (e.g., programmable) elements arranged in a structure that supports these functions. The software or firmware providing the emulation may be provided on non-transitory computer-readable storage medium comprising instructions to allow a processor to carry out those functionalities.

In another example embodiment, the electrical circuits of the FIGURES may be implemented as stand-alone modules (e.g., a device with associated components and circuitry configured to perform a specific application or function) or implemented as plug-in modules into application specific hardware of electronic devices. Note that particular embodiments of the present disclosure may be readily included in a system on chip (SOC) package, either in part, or in whole. An SOC represents an IC that integrates components of a computer or other electronic system into a single chip. It may contain digital, analog, mixed-signal, and often radio frequency functions: all of which may be provided on a single chip substrate. Other embodiments may include a multi-chip-module (MCM), with a plurality of separate ICs located within a single electronic package and configured to interact closely with each other through the electronic package. In various other embodiments, the amplification functionalities may be implemented in one or more silicon cores in Application Specific Integrated Circuits (ASICs), Field Programmable Gate Arrays (FPGAs), and other semiconductor chips.

It is also imperative to note that all of the specifications, dimensions, and relationships outlined herein (e.g., the number of processors, logic operations, etc.) have only been offered for purposes of example and teaching only. Such information may be varied considerably without departing from the spirit of the present disclosure, or the scope of the appended claims. The specifications apply only to one non-limiting example and, accordingly, they should be construed as such. In the foregoing description, example embodiments have been described with reference to particular processor and/or component arrangements. Various modifications and changes may be made to such embodiments without departing from the scope of the appended claims. The description and drawings are, accordingly, to be regarded in an illustrative rather than in a restrictive sense.

Note that the activities discussed above with reference to the FIGURES are applicable to any integrated circuits that involve signal processing, particularly those that can execute specialized software programs, or algorithms, some of which may be associated with processing digitized real-time data. Certain embodiments can relate to multi-DSP signal processing, floating point processing, signal/control processing, fixed-function processing, microcontroller applications, etc.

In certain contexts, the features discussed herein can be applicable to medical systems, scientific instrumentation, wireless and wired communications, radar, industrial process control, audio and video equipment, current sensing, instrumentation (which can be highly precise), and other digital-processing-based systems.

Moreover, certain embodiments discussed above can be provisioned in digital signal processing technologies for medical imaging, patient monitoring, medical instrumentation, and home healthcare. This could include pulmonary monitors, accelerometers, heart rate monitors, pacemakers, etc. Other applications can involve automotive technologies for safety systems (e.g., stability control systems, driver assistance systems, braking systems, infotainment and interior applications of any kind). Furthermore, powertrain systems (for example, in hybrid and electric vehicles) can use high-precision data conversion products in battery monitoring, control systems, reporting controls, maintenance activities, etc.

In yet other example scenarios, the teachings of the present disclosure can be applicable in the industrial markets that include process control systems that help drive productivity, energy efficiency, and reliability. In consumer applications, the teachings of the signal processing circuits discussed above can be used for image processing, auto focus, and image stabilization (e.g., for digital still cameras, camcorders, etc.). Other consumer applications can include audio and video processors for home theater systems, DVD recorders, and high-definition televisions. Yet other consumer applications can involve advanced touch screen controllers (e.g., for any type of portable media device). Hence, such technologies could readily part of smartphones, tablets, security systems, PCs, gaming technologies, virtual reality, simulation training, etc.

Note that with the numerous examples provided herein, interaction may be described in terms of two, three, four, or more electrical components. However, this has been done for purposes of clarity and example only. It should be appreciated that the system can be consolidated in any suitable manner. Along similar design alternatives, any of the illustrated components, modules, and elements of the FIGURES may be combined in various possible configurations, all of which are clearly within the broad scope of this Specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

It is also important to note that the functions related to the fast control interface illustrate only some of the possible control interface functions that may be executed by, or within, systems illustrated in FIGS. 1, 2, and 9. Some of these operations may be deleted or removed where appropriate, or these operations may be modified or changed considerably without departing from the scope of the present disclosure. In addition, the timing of these operations may be altered considerably. The preceding operational flows have been offered for purposes of example and discussion. Substantial flexibility is provided by embodiments described herein in that any suitable arrangements, chronologies, configurations, and timing mechanisms may be provided without departing from the teachings of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

OTHER NOTES, EXAMPLES, AND IMPLEMENTATIONS

Note that all optional features of the apparatus described above may also be implemented with respect to the method or process described herein and specifics in the examples may be used anywhere in one or more embodiments.

In a first example, a system is provided (that can include any suitable circuitry, dividers, capacitors, resistors, inductors, ADCs, DFFs, logic gates, software, hardware, links, etc.) that can be part of any type of computer, which can further include a circuit board coupled to a plurality of electronic components. The system can include means for clocking data from the digital core onto a first data output of a macro using a first clock, the first clock being a macro clock; means for clocking the data from the first data output of the macro into the physical interface using a second clock, the second clock being a physical interface clock; means for clocking a first reset signal from the digital core onto a reset output of the macro using the macro clock, the first reset signal output used as a second reset signal; means for sampling the second reset signal using a third clock, which provides a clock rate greater than the rate of the second clock, to generate a sampled reset signal; and means for resetting the second clock to a predetermined state in the physical interface in response to a transition of the sampled reset signal.

The 'means for' in these instances (above) can include (but is not limited to) using any suitable component discussed herein, along with any suitable software, circuitry, hub, computer code, logic, algorithms, hardware, controller, interface, link, bus, communication pathway, etc. In a second example, the system includes memory that further comprises machine-readable instructions that when executed cause the system to perform any of the activities discussed above.

What is claimed is:

1. A transceiver to interface with a baseband processor, the transceiver comprising:
    a signal processing part comprising one or more receive channels and one or more transmit channels; and
    a control interface part coupled to the baseband processor, the control interface part to receive, from the baseband processor:
        a framing sequence to indicate to the transceiver to receive control data, and
        control data, wherein the control data includes a frame header and payload control data, wherein the frame header is provided after the framing sequence, and the payload control data is provided after the frame header,
    wherein the payload control data includes transceiver control parameters for control of the signal processing part.

2. The transceiver of claim 1, wherein:
    the control interface part includes input lines coupled to the baseband processor,
    the input lines include a clock input and a control data input, and
    the control data input is to receive signal parameters for the signal processing part.

3. The transceiver of claim 2, wherein the clock input includes a differential clock input, and the control data input includes lines for receiving differential control data signals.

4. The transceiver of claim 1, wherein the control interface part further includes a deserializer to deserialize the control data.

5. The transceiver of claim 4, wherein the deserializer is further to detect the framing sequence and unwrap the frame header and the payload control data following the framing sequence.

6. The transceiver of claim 1, wherein the framing sequence includes a predetermined sequence of bits used for frame demarcation.

7. The transceiver of claim 1, wherein the control interface part is further to receive a closing sequence following the payload control data, the closing sequence indicating an end of the payload control data.

8. The transceiver of claim 1, wherein the frame header includes one or more bits for specifying a type of payload control data being provided to the control interface part.

9. The transceiver of claim 1, wherein the frame header includes one or more bits for specifying expected size of the payload control data.

10. The transceiver of claim 1, wherein the frame header includes a flag for low latency payload control data indicating that the payload control data includes gain loop control information, wherein at least a part of the payload control data is provided as part of the frame header.

11. A transceiver configured to interface with a baseband processor, the transceiver comprising:
    a signal processing part comprising one or more receive channels and one or more transmit channels; and
    a control interface part coupled to the baseband processor, the control interface part to transmit, from the transceiver to the baseband processor:
        a framing sequence to indicate to the baseband processor to receive control data; and
        control data, wherein the control data includes a frame header and payload control data, the frame header follows the framing sequence, and the payload control data follows the frame header, and the payload control data includes baseband processor control parameters for control of the baseband processor.

12. The transceiver of claim 11, wherein:
the control interface part includes output lines coupled to the baseband processor,
the output lines include a clock output and a control data output, and
the control data output is to transmit signal parameters to the baseband processor.

13. The transceiver of claim 12, wherein the clock output includes a differential clock output, and the control data output includes lines for transmitting differential control data signals.

14. The transceiver of claim 11, wherein the control interface part further comprises a serializer to serialize the frame header and the payload control data.

15. The transceiver of claim 14, wherein the serializer is further to serialize the framing sequence and the control data, the frame header and the payload control data following the framing sequence.

16. The transceiver of claim 11, wherein the framing sequence includes a predetermined sequence of bits used for frame demarcation.

17. The transceiver of claim 11, wherein the control interface part is further to transmit a closing sequence following the payload control data, the closing sequence indicating an end of the payload control data.

18. A method for closed loop operation between a transceiver and a baseband processor, the method comprising:
receiving a framing sequence at a control interface, wherein the control interface is an interface between the transceiver and the baseband processor; and
in response to receiving the framing sequence, begin receiving first control data over the control interface, wherein the control data includes a first frame header and first payload control data, the control data begins with the first frame header and the first payload control data provided after the first frame header, and the payload control data is to control of one of the baseband processor or the transceiver.

19. The method of claim 18, wherein:
the control interface includes input lines coupling the baseband processor and the transceiver,
the input lines include a clock input and a control data input, and
the control data input is to receive at least a portion of the payload control data.

20. The method of claim 18, further comprising:
detecting the framing sequence; and
unwrapping the frame header and the payload control data following the framing sequence.

* * * * *